United States Patent
De Benedittis et al.

(10) Patent No.: US 7,953,404 B2
(45) Date of Patent: May 31, 2011

(54) METHOD TO DECENTRALIZE THE COUNTING OF ABNORMAL CALL RELEASE EVENTS ON A PER CELL BASE IN DIGITAL CELLULAR COMMUNICATION NETWORKS

(75) Inventors: Rossella De Benedittis, Milan (IT); Michael Heilig, Ulm (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 499 days.

(21) Appl. No.: 11/661,338

(22) PCT Filed: Aug. 24, 2005

(86) PCT No.: PCT/EP2005/054147
§ 371 (c)(1),
(2), (4) Date: Nov. 17, 2008

(87) PCT Pub. No.: WO2006/021562
PCT Pub. Date: Mar. 2, 2006

(65) Prior Publication Data
US 2009/0082007 A1    Mar. 26, 2009

(30) Foreign Application Priority Data
Aug. 27, 2004   (EP) .................................... 04425637

(51) Int. Cl.
*H04W 24/00*    (2009.01)
(52) U.S. Cl. ..................... 455/423; 370/241; 370/252
(58) Field of Classification Search .................. None
See application file for complete search history.

(56) References Cited

U.S. PATENT DOCUMENTS

| | | | |
|---|---|---|---|
| 6,898,429 B1 | 5/2005 | Vialen et al. | |
| 7,031,277 B2 | 4/2006 | Choi et al. | |
| 7,499,701 B2 * | 3/2009 | Salonaho et al. | ............. 455/423 |
| 2002/0051431 A1 | 5/2002 | Choi et al. | |
| 2003/0083040 A1 | 5/2003 | Ruth et al. | |

(Continued)

FOREIGN PATENT DOCUMENTS

| | | |
|---|---|---|
| EP | 1 271 979 A1 | 1/2003 |
| JP | 2002539686 T | 11/2002 |
| JP | 2004504762 T | 2/2004 |

*Primary Examiner* — Ajit Patel
(74) *Attorney, Agent, or Firm* — Laurence A. Greenberg; Werner H. Stemer; Ralph E. Locher (57) ABSTRACT

In one aspect, a method to collect performance measurements a digital cellular communication network is provided. Radio links of the active set are set up both inside the serving cell and towards one or more adjacent cells belonging to adjacent clusters controlled by respective radio network controllers. Controllers are connected to one another in order to act either as master of the active set in communication with the core network or slave for managing directly controlled radio resources and executing requests from the master devoted to radio link set up or deletion. The master radio controller, when calling a slave for requesting a specific radio link deletion from the active set, also sends to it some information about the cause of that deletion. The slave radio controller when receives the cause information increments a performance measurement counter associated to the specific cause and to the specific cell the radio link deletion is requested for. Operatively, the 3GPP RNSAP Radio Link Deletion Request message is upgraded to include an Element used to specify the "Cause" of the deletion. Periodically the network operator recovers the counters to associate the specific radio link failure events to the specific cells.

8 Claims, 8 Drawing Sheets

U.S. PATENT DOCUMENTS

2004/0038681 A1* 2/2004 Chun ............................ 455/436
2004/0077331 A1 4/2004 King
2006/0084390 A1* 4/2006 Salonaho et al. .......... 455/67.11
2007/0153687 A1* 7/2007 Attar et al. .................... 370/229

* cited by examiner

Radio link Deletion procedure over the Iur, successful case

```
S-RNC ─────Radio LinkDeletionRequest─────▶ D-RNC
      ◀────Radio linkDeletionResponse─────
```

FIG. 4

RNSAP Radio LinkDeletionRequestMessageContent (TS 25.423)

| IE/Group Name | Presence | Range | IE Type and Reference | Semantics Description | Criticality | Assigned Criticality |
|---|---|---|---|---|---|---|
| Message Type | M | | 9.2.1.40 | | YES | reject |
| Transaction ID | M | | 9.2.1.59 | | – | |
| RL Information | | <maxnoofRLs> | | | EACH | notify |
| RL ID | M | | 9.2.1.49 INTEGER (0..31) | | – | |

Where:

| Range bound | Explanation |
|---|---|
| RL ID | Maximum number of Radio Links for one UE |

FIG. 5

RNSAP Radio LinkDeletionResponeMessageContent (TS 25.423)

| IE/Group Name | Presence | Range | IE Type and Reference | Semantics Description | Criticality | Assigned Criticality |
|---|---|---|---|---|---|---|
| Message Type | M | | 9.2.1.40 | | YES | reject |
| Transaction ID | M | | 9.2.1.59 | | – | |
| Criticality Diagnostics | O | | 9.2.1.13 | | YES|ignore | |

FIG. 6

ProposedchangestoRNSAP Radio LinkDeletionRequestMessageContent

| IE/Group Name | Presence | Range | IE Type and Reference | Semantics Description | Criticality | Assigned Criticality |
|---|---|---|---|---|---|---|
| Message Type | M | | 9.2.1.40 | | YES | reject |
| Transaction ID | M | | 9.2.1.59 | | – | |
| RL Information | M | <maxnoofRLs> | | | EACH | notify |
| RL ID | M | | 9.2.1.49 INTEGER (0..31) | | – | |
| Cause | O | | | | YES | ignore |

METHOD TO DECENTRALIZE THE COUNTING OF ABNORMAL CALL RELEASE EVENTS ON A PER CELL BASE IN DIGITAL CELLULAR COMMUNICATION NETWORKS

CROSS REFERENCE TO RELATED APPLICATIONS

This application is the US National Stage of International Application No. PCT/EP2005/054147, filed Aug. 24, 2005 and claims the benefit thereof. The International Application claims the benefits of European application No. 04425637.8 EP filed Aug. 27, 2004, both of the applications are incorporated by reference herein in their entirety.

FIELD OF THE INVENTION

The present invention relates to the field of digital cellular communication networks and more precisely to a method to decentralize the counting of abnormal call release events on a per cell base in a digital cellular communication network which foresees multiple radio links between the radio access network and the connected user equipment.

BACKGROUND OF INVENTION

A list of acronyms is reported in APPENDIX 1.

Figure 1A:
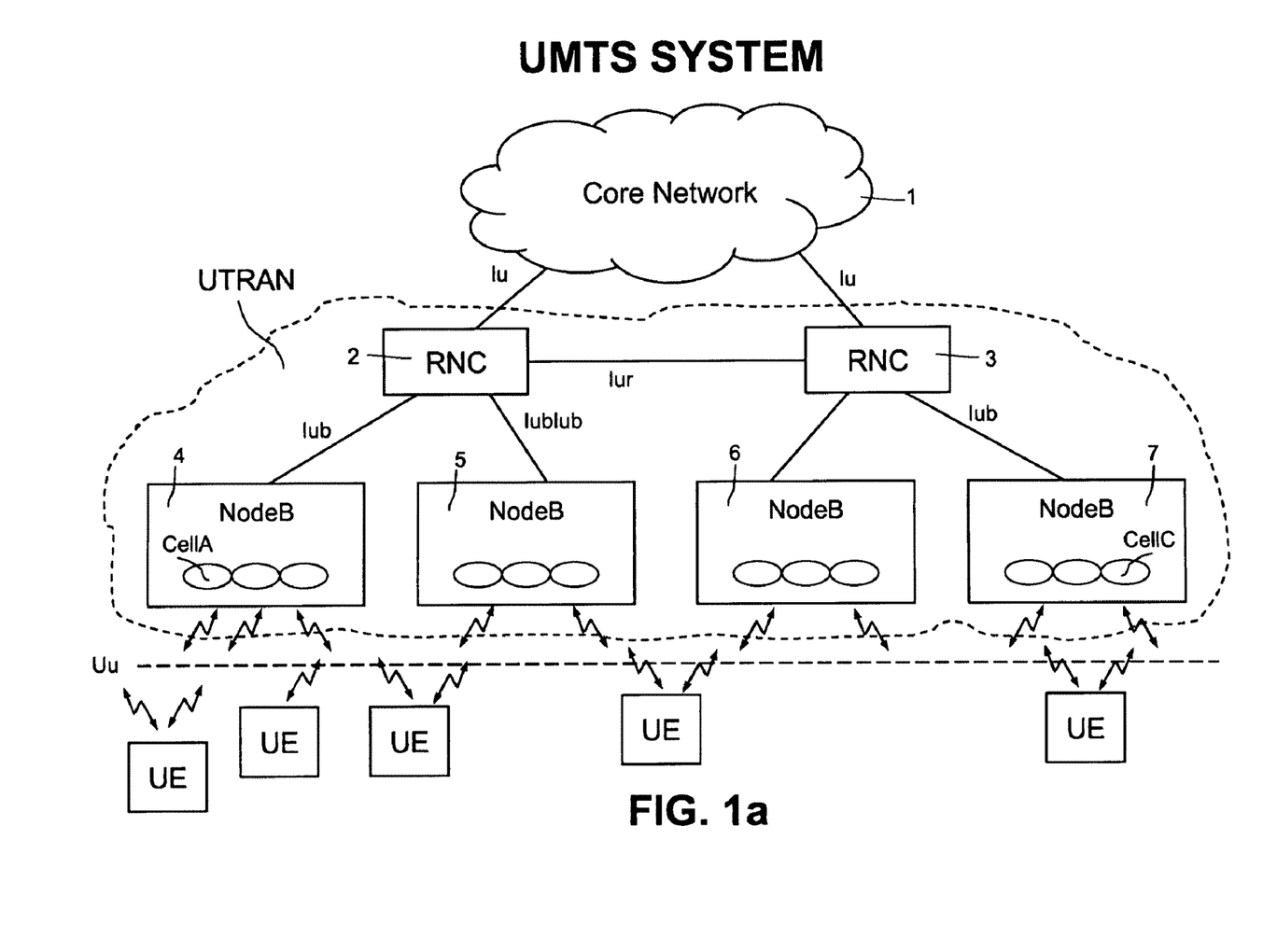
FIG. 1a shows the general diagram of an UMTS system.

FIG. 1a reports the general diagram of an UMTS system constituting the preferred but not exclusive environment for the application of the present invention. The description will be provided for an UMTS FDD and TDD system, where the claimed method well fits due to the specific network architecture, but it can be easily extended to other kind of cellular networks like for instance GSM which makes use of a similar network architecture.

UMTS of FIG. 1a comprises a Core Network 1 (see TS 23.002) connected to an UTRAN (see TS 25.401), in its turn connected via radio to several mobile user equipments UEs. UTRAN and its served UEs constitute a RNS (see TS 23.110). UTRAN includes a certain number of Radio Network Controllers RNC of the type 2 and 3, each connected to a respective cluster of so-called Node B blocks 4, 5 and 6, 7 interfaced to the UEs. As known, all PLMNs are deployed on a territory subdivided into contiguous service cells, each corresponding to the radio coverage area of a fixed base station. One or more cells compose a Node B. The two RNCs 2 and 3 are connected: to each other by the Iur interface, to the NodeBs 4 to 7 by means of as many Iub interfaces, and to the Core Network 1 through the Iu interface. NodeBs and the UEs are connected to each other through the Uu radio interface. Transmissions on the Uu interface are based on a CDMA technique which implies that multiple signals can be transmitted in the same time interval and in the same frequency band, but separated in the code domain. Depending on the adopted standard, the CDMA transmissions can be further based on TDMA technique. The TDMA technique implies that each frame is subdivided in a fixed number of timeslots, each of them conveying one or more CDMA bursts, and different timeslots of the frame can be assigned to different users or alternatively to pilots a common signalling channel.

Figure 1B:
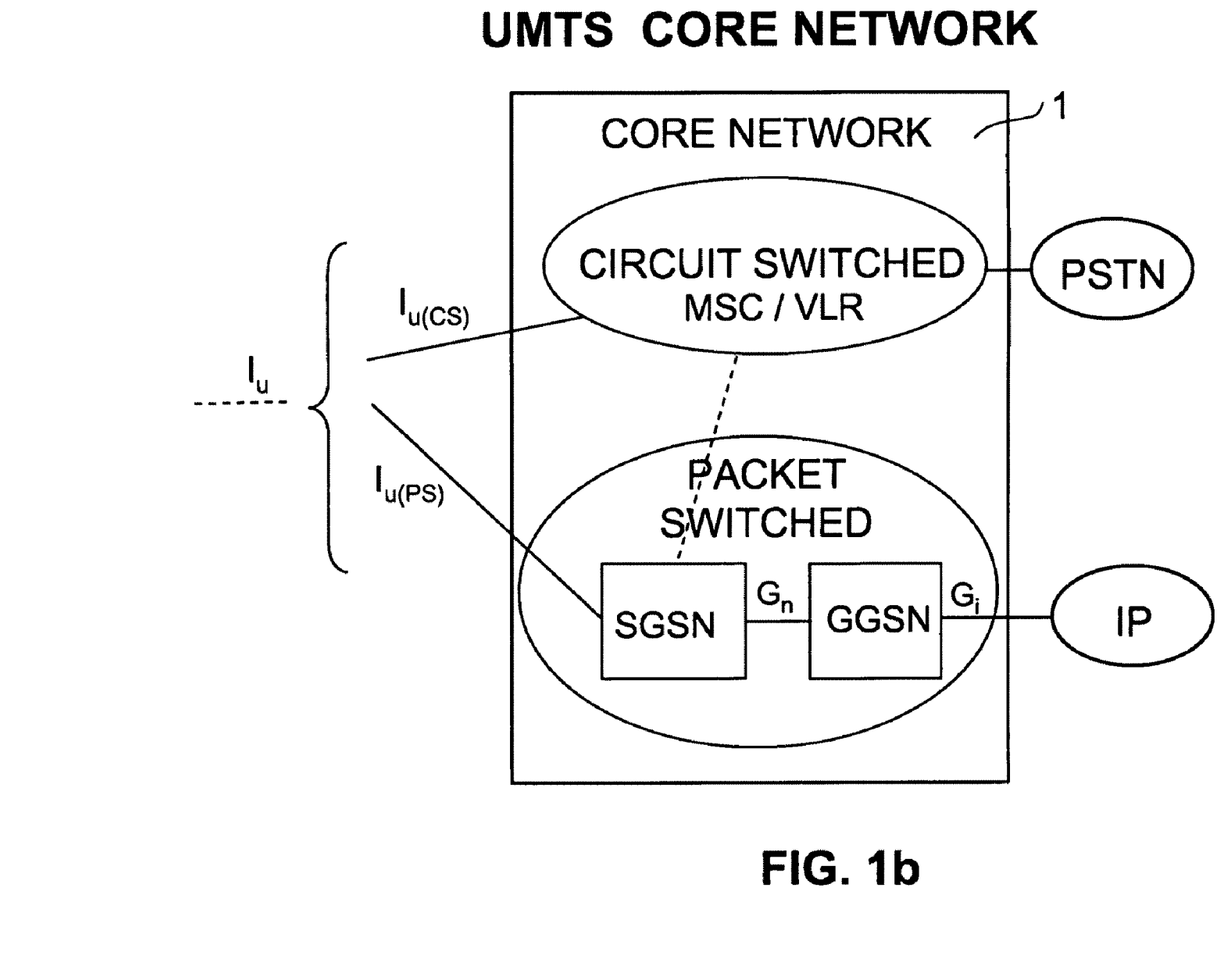

With reference to the exemplary network architecture described in FIG. 1b, the core network CN includes a CIRCUIT SWITCHED part and a PACKET SWITCHED part. The first one is connected to the PSTN (Public Switched Telephone Network) while the second one is connected to the IP (Internet Protocol) network. The circuit switched part includes the MSCNVLR network elements which together allow wandering of users inside the territory covered by the network. The packet switched part includes two network elements known as SGSN and GGSN. The first one is interfaced to the MSCJVLR and to the HLR to catch location information of the UEs in the packet switched domain. The S-RNC is interfaced to the MSCNVLR block through the Iu(CS) interface and to the SGSN node through the Iu(PS) interface. The SGSN node is further interfaced to the GGSN node through the Gn interface. The GGSN node is further interfaced to the IP network through the Gi interface.

Figure 2:
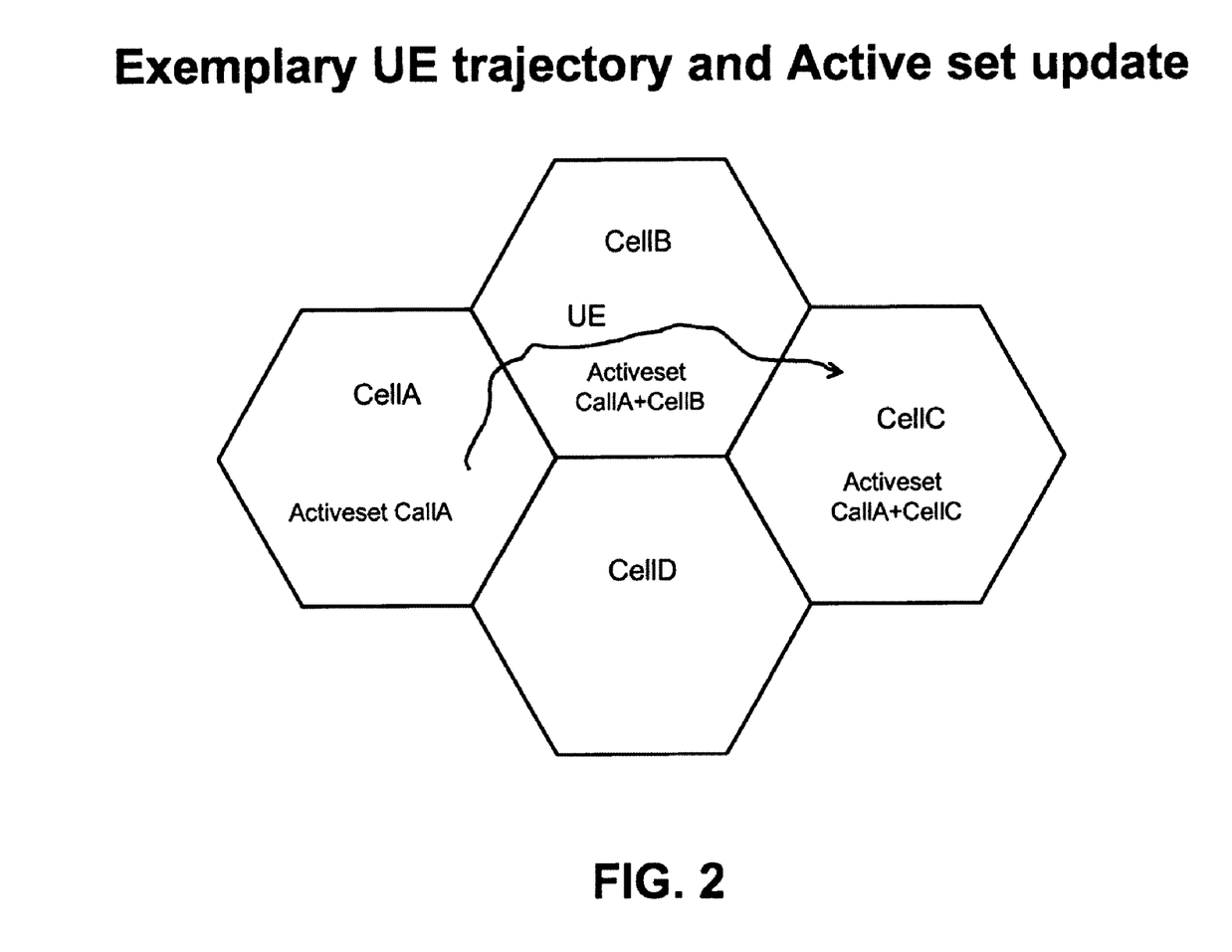
FIG. 2 shows the Active radio link set changes during movement of the UE from Cell A to Cell C.

As far as the operation is concerned, the RNC is responsible of the Layer 2 (RLC, MAC) and Layer 3 (RRC) protocol stacks, as well as of the requested line protocols for interfacing the Core Network and the controlled NodeBs. The NodeB is responsible of Layer 1 as well as of the requested line protocols for interfacing the UEs and the RNC. Contrary to GSM, in a UMTS system a radio connection between the UE and the radio access network can make use of more than one radio link; the totality of the radio links constitutes the so called "Active set" and the functionality they allow is the so called "macro diversity" also useful for "Soft handover". Macro diversity permits the UE to exploit reception from multiple links, combing all the received signals in the most efficient way. During the course of the connection, the number of cells composing the active set can be changed, that is some cells can be removed and some others can be added, following the UE mobility. As an example, FIG. 2 depicts the case of a UE initially connected to Cell A, so having an active set composed by one cell (Cell A) only; then adding Cell B, therefore with two cells (Cell A and Cell B) in the active set, and finally replacing Cell A with Cell C, so again with two cells (Cell A and Cell C) in the active set. In the case that Cell A is connected to a first RNC, and Cell B and Cell C to a second RNC, it comes out that at the end the UE is only connected to Cell A and Cell C, indirectly managed by the first RNC. This case of course applies if no RNC relocation happened in between; i.e. if the management of the connection is not transferred from the first RNC to the second RNC, operation which actually does not happen frequently.

Figure 3:
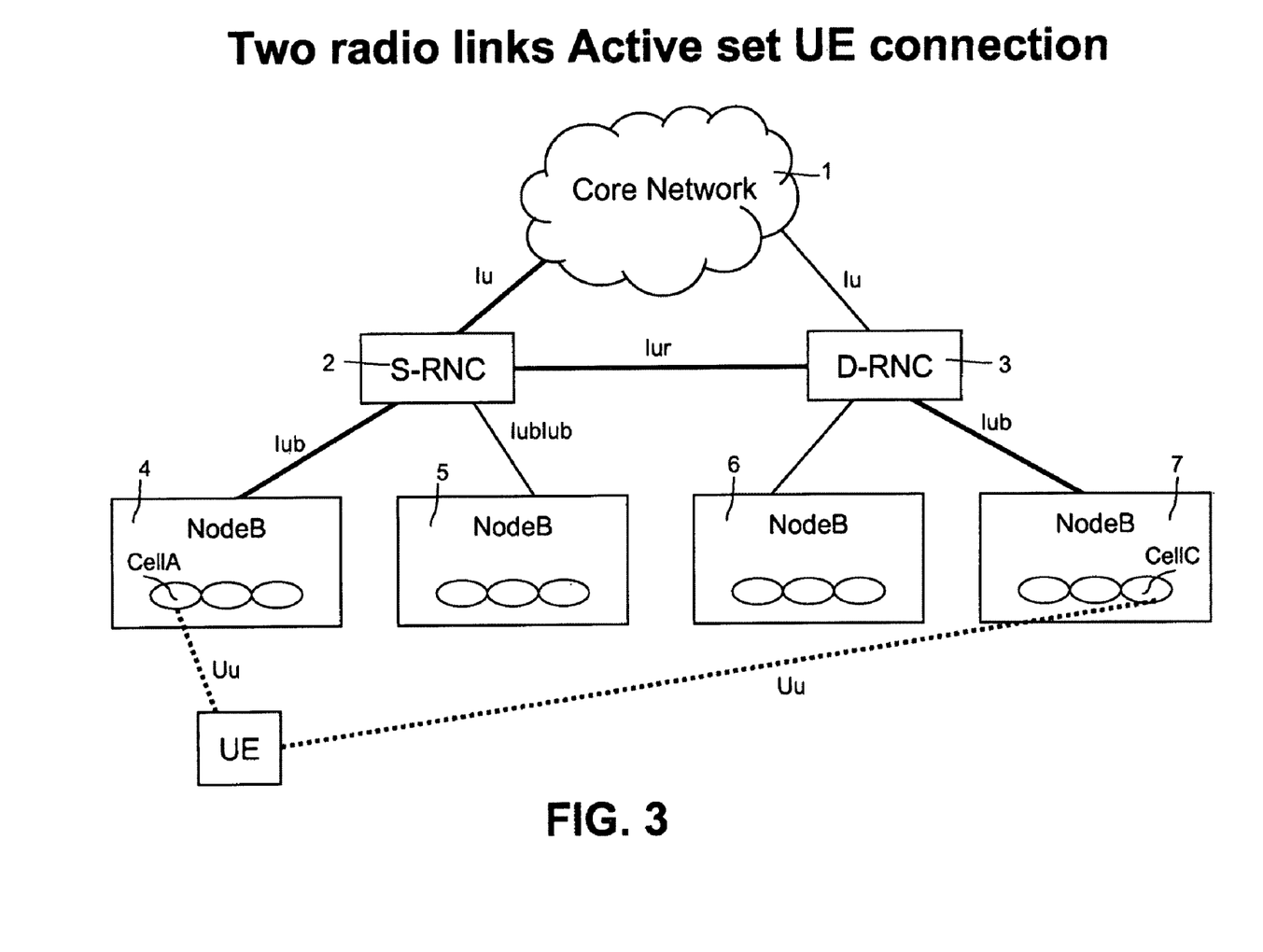

Though multiple cells, and possibly also multiple NodeBs, only one RNC controls, maintains and terminates the control of a radio connection. The controlling RNC is named Serving RNC (S-RNC) whereas the other involved RNCs are named Drift RNCs (D-RNC). The D-RNC is responsible for managing the resources of the directly controlled NodeB(s) and to transfer the information between these NodeBs and the S-RNC. The D-RNC communicates with the S-RNC over the Iur interface. S-RNC decides to add, remove or replace radio links from the active set, and terminates the call towards the core network. FIG. 3 represents an application of the example of FIG. 2 to the UTRAN of FIG. 1a, where RNC 2 plays the role of S-RNC whereas RNC 3 the role of D-RNC. In the scenario of FIG. 3 the connections and interfaces of the active set are indicated by thick lines.

3GPP, the $3^{rd}$ Generation Partnership Project, is responsible for standardising UMTS FDD and TDD radio access networks. 3GPP TS 25.423: "Technical Specification Group Radio Access Network; UTRAN Iur Interface RNSAP Signalling" has defined the messages exchanged over the Iur between the S-RNC and the D-RNC for adding or deleting radio links; these Layer 3 messages are in accordance with the protocol RNSAP. RNSAP supports basic inter-RNC mobility and Dedicated Channel (DCH) traffic, as well as Common Channel (CCH) traffic transmission.

Generally, all radio access networks collect traffic data, which allow an operator to monitor the offered service quality and possibly take the appropriate countermeasures when this is judged to be not as good as expected. Such data collection is done by the so called Performance Measurement (PM) counters, i.e. by counters of specific traffic events such as:

Number of radio access attempts;
Number of radio access successes;
Number of radio link failures;
Number of Handover attempts, and so on.

The report of a specific event can also be done with reference to a specific cause, e.g. number of radio access attempts "for signalling connection" or "for Packet call" or "for Circuit switched call", etc. Data collected by a PM counter can highlight problems or inefficiencies in the network which cannot be visible otherwise. A hardware fault can be immediately signalled by the specific alarm, when foreseen, but e.g. a software bug or a suboptimum cell planning do not end up in a clear alarm notification. Here, only after collecting a consistent amount of traffic data and performing some post elaboration, a sensible conclusion can be drawn. Now, PM counters are actually collectors of traffic events which allow such post elaboration. Therefore, for such kind of problems, they remain the only effective instruments at the hands of the operator for controlling his network. However, for a PM counter being effective, it is important that it does not only report the numerousness of a given event, but also the information of where the collected data have been taken. This is particularly true for PM counters collecting radio link failure events, that is the numerousness of those events which caused the release of a radio link and possibly the drop of the call. For these cases, it is very important for the operator to know the affected cells in order to start the investigation and eventually intervene as appropriate.

In general, the more precise the provided geographical information is, the more the memory requirements are at the network element collecting the traffic data. In the case of PM counters collecting radio link failure events, due to the huge amount of recording memory required, providing this geographical information is not easily affordable with the actual standardization, with the consequence that generally the effectiveness of the reported data is drastically reduced. The problem arises from the interaction between the mechanism foreseen to count radio link failure events which end up with the release of the radio connection. In fact, it is important to observe that the deletion of a radio link does not necessarily end up with the release of the radio connection: e.g. a radio link can be part of an active set counting more radio links or can be replaced by another radio link offering better receive characteristics. However, D-RNC has no means to conclude whether the radio connection will continue to be active after the radio link deletion or will be released.

Figure 4:
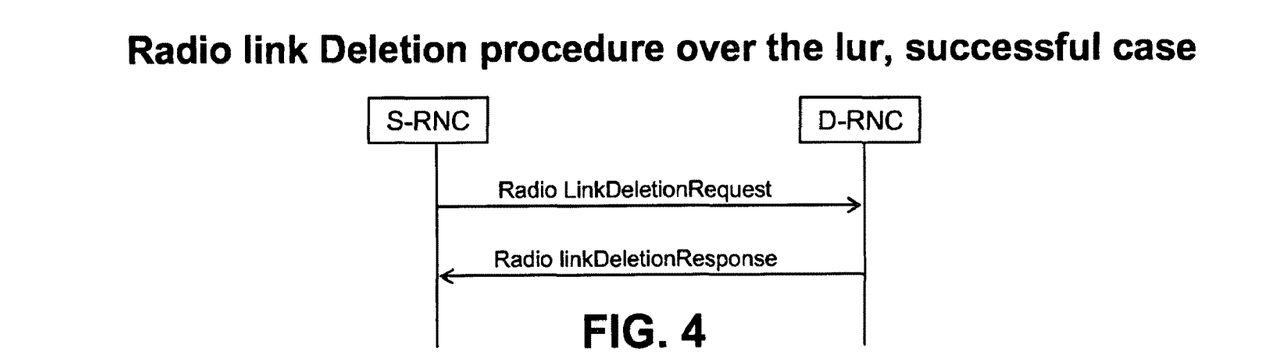
FIG. 4 shows the successful case of a Radio Link Deletion procedure over the Iur interface of FIG. 3 according to 3GPP TS 25.423.
Figure 5:
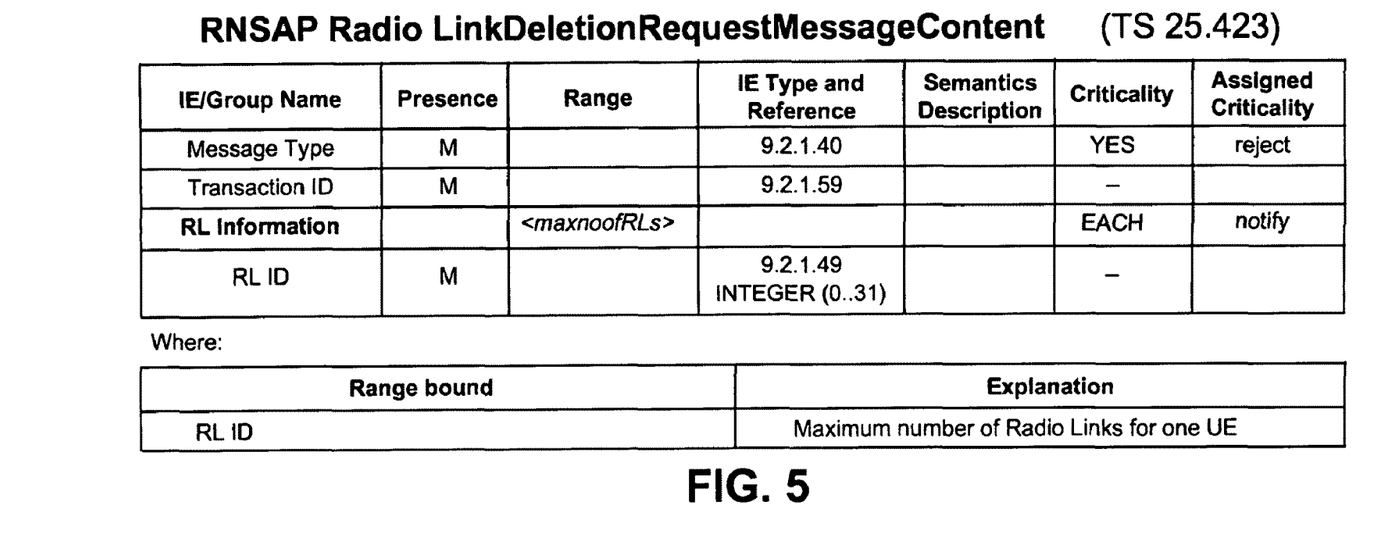
FIG. 5 shows the content of the RNSAP Radio_Link_Deletion_Request message according to 3GPP TS 25.423.
Figure 6:
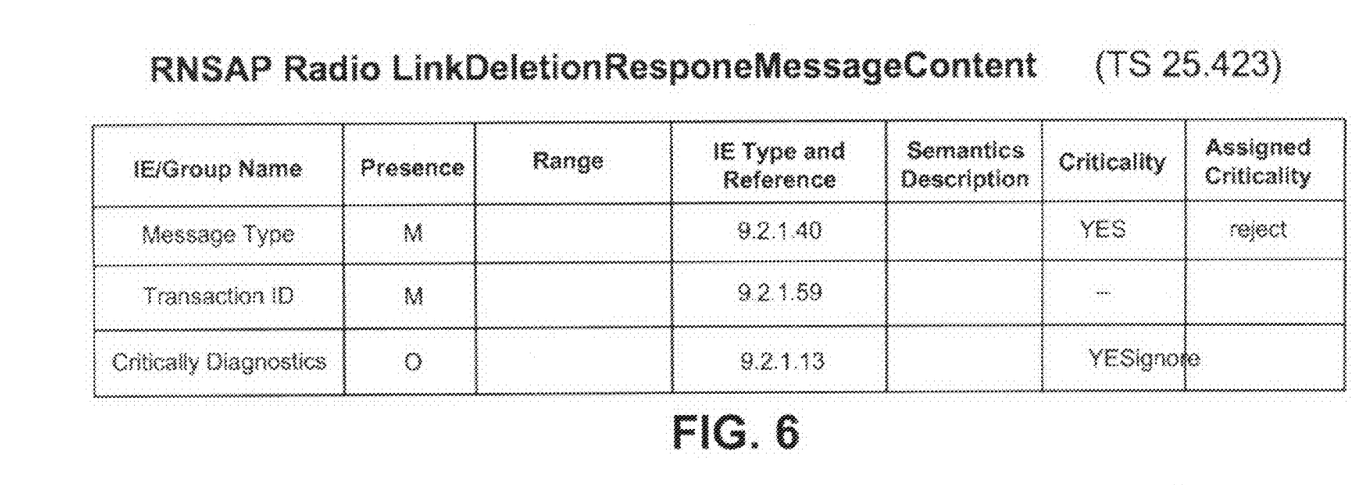
FIG. 6 shows the content of the Radio_Link_Deletion_Response message according to 3GPP TS 25.423.

The next FIGS. 4, 5, and 6 reproduced by TS 25.423 help us to understand this fact. FIG. 4 shows the Radio Link Deletion procedure over the Iur interface of FIG. 3 in case of successful case. With reference to FIG. 4, the S-RNC sends a RNSAP Radio_Link_Deletion_Request message to the D-RNC, which firstly successfully completes the deletion of the radio link existing between the UE and Cell C and then sends back a Radio_Link_Deletion_Response message to the S-RNC. The radio link existing between the UE and Cell C is directly deleted by the S-RNC. FIG. 5 shows the content of the RNSAP "Radio_Link_Deletion_Request" message, while FIG. 6 shows the content of the "Radio_Link_Deletion_Response" message. With reference to FIG. 5, the meaning of the various voices of the IE/Group Name is listed below:

The Message Type uniquely identifies the message being sent.
The Transaction ID is used to associate all the messages belonging to the same procedure. Messages belonging to the same procedure shall use the same Transaction ID. This ID is determined by the initiating peer of a procedure.
The RL ID is the unique Identifier (ID) for one RL associated to a UE.

As shown in FIG. 5, the Radio_Link_Deletion_Request message sent by the S-RNC contains no indication to the D-RNC as to whether the radio connection will continue to be active after the radio link deletion or will be released. The conclusion is that only the S-RNC is currently able to count the number of radio connection release events following the removal of a radio link. Now, as explained above, removal of a radio link can be triggered by a bad received quality, e.g. the lost of synchronisation to that radio link at the receiving NodeB. Loss of uplink synchronisation which ends up with a release of a radio connection, is considered as an abnormal event which should be avoided as much as possible. Its occurrence can reveal a lack of radio coverage or the presence of an unexpected interference which needs to be solved out by the operator. But as explained above, in order for an operator to take the appropriate remedy in front of a big number of radio connection releases due to a radio link failure cause, it is imperative to know the cell identity where such big number of failure events occurred. In order to provide the needed geographical information together with the collected data, the S-RNC should store as much PM counters for connection release events due to a radio link failure as the number of directly controlled cells, i.e. cells belonging to NodeBs connected to the S-RNC via Iub, as well as possibly indirectly controlled cells, i.e. cells belonging to NodeBs connected to the S-RNC via Iur. While storing the cell identity of the directly controlled cells is feasible and generally done, this is not the case for the other cells, fundamentally because their number can be very big. To provide some figures: in average, the number of cells which are directly managed by an RNC can be of the order of 1000, And RNC can usually have up to 8 Iur connections with different RNCs, therefore it comes out that recording cell context of the neighbour RNCs would increase the number of PM counters from 1000 to 8000. This is surely a cumbersome and very expensive task to carry out indeed, also considering that a lot of additional information fields other then the pure counting are associated to each PM counter for connection release events due to a radio link failure.

Three known ways at least have been proposed to partially remedy to this issue; they are illustrated in the following. A first one consists to provide the S-RNC with a basket PM counter which is incremented every time a connection is abnormally released due to that the D-RNC is reporting back notice of a radio link failure detected in one of its directly connected cells. The drawback is that, having a unique PM counter for all possible indirectly connected cells, no information of the geographical position of the affected cells can be provided. A second proposal is that to define in the S-RNC as many PM counters as the number of D-RNCs which is possible to connect; each time a connection is abnormally released due to that one of the connected D-RNCs is reporting back the indication of radio link failure event, the specific PM counter assigned to that D-RNC will be accordingly incremented. Even though this method allows to know in which RNC the failure event happened, yet the geographical information is still unknown. The third proposal is that to define in the S-RNC as many PM counters as the number of possible indirectly connected cells which belong to the first ring of neighbourhood. Also in this case the exact geographical position of the interested cell may not always be available, in spite of the increased number of PM counters.

SUMMARY OF INVENTION

The main object of the present invention is that to overcome the drawbacks of the prior art and to indicate a method to count up abnormal call release events due to radio link failure in digital cellular communication networks deploying multiple radio links between the mobile and the radio access network, without asking for extra memory requirements to the collecting network entity.

The invention achieves said object by providing a method to collect performance measurements about events related to radio link deletion in digital cellular communication networks deploying multiple radio links between the radio access network and the connected mobile, as disclosed in the relevant claims. More precisely, a multiple radio link is set up both inside the serving cell and towards one or more cells of adjacent clusters, each cluster being controlled by an its own radio controller which is further connected to one or more radio controllers of the adjacent clusters to act either as a master of the multiple radio link in communication with the core network or slave for managing directly controlled radio resources and requests from the master devoted to set up or delete singular radio links. According to the method of the invention the master radio controller, when calling the slave radio controller asking for a specific radio link deletion due to some various causes, also informs it on the nature of the deletion cause. Upon the reception of the cause, the slave controller increments an internal performance counter specific to that cause and specific to the cell the radio link deletion is requested for. The cause is specialized with the indication of the occurrence, or not, of the call release (call drop/termination). Call release is to be intended as the release of the pool of resources assigned to the mobile for communicating with the access network. Call release can be either normal or abnormal. Normal call release happens for example in case of voluntary termination from one of the two interacting parts. Calls are surely abnormally terminated when the radio access network has definitely lost its uplink synchronization with a mobile, because of the failure of all radio links of the Active set of that mobile. Calls might be also abnormally terminated by the network due to excessive traffic inside the service area.

A way to achieve the goal of the invention is that to add to the Radio_Link_Deletion_Request message (normally sent by the master to the slave radio controller) an additional information element containing the "cause" of the deletion request. In this way, the slave radio controller itself will be able to increment a PM counter associated to that specific cell and to that specific "cause" of the radio link deletion for counting events, such as:

- abnormal call termination for loss of the uplink synchronization from the mobile;
- radio link failure without call drop;
- normal call termination;
- abnormal call termination due to excessive traffic inside the service area;
- radio link deletion, with or without call termination, due to RAB establishment failure (for example for additional voice/packet service to the presently existing service);
- radio link deletion due to other causes at the discretion of the operator.

As a consequence of the added "cause" information the operator will be able to associate the specific counted event to the specific geographical area, so that, contrarily to known solutions, sensible information is not lost. Taking into account that each radio controller usually stores the context of all directly connected cells, it comes out that this solution does not require any additional memory requirements at the collecting network element.

As a consequence, other object of the invention is an RNSAP Radio Link Deletion Request message containing the specific cause of the deletion request, as disclosed in the relevant claim.

The item of the invention well fits to a UMTS FDD system, but it can be easily extended to the TDD mode, which foresees the same network architecture and the same message exchange over the line interfaces, as well as to any other system which foresees a direct logical connection between two radio controllers (e.g.: RNC or BSC).

BRIEF DESCRIPTION OF THE DRAWINGS

The features of the present invention which are considered to be novel are set forth with particularity in the appended claims. The invention and its advantages may be understood with reference to the following detailed description of an embodiment thereof taken in conjunction with the accompanying drawings given for purely non-limiting explanatory purposes and wherein:

FIG. 1b shows the general diagram of the core network of FIG. 1a;

FIG. 3 highlights with thick lines an application of the example of FIG. 2 to the UTRAN of FIG. 1a;

DETAILED DESCRIPTION OF AN EMBODIMENT OF THE INVENTION

The description of the preferred embodiment of the invention avails of the description of the preceding figures referred to an UMTS network. The network is deployed on a territory subdivided into contiguous service cells, each corresponding to the radio coverage area of a fixed base station. One or more cells compose a so-called Node B. Each Node B is connected via radio with a plurality of UEs. More contiguous NodeBs are physically connected to an RNC, in its turn connected to the Core Network.

Figure 7:
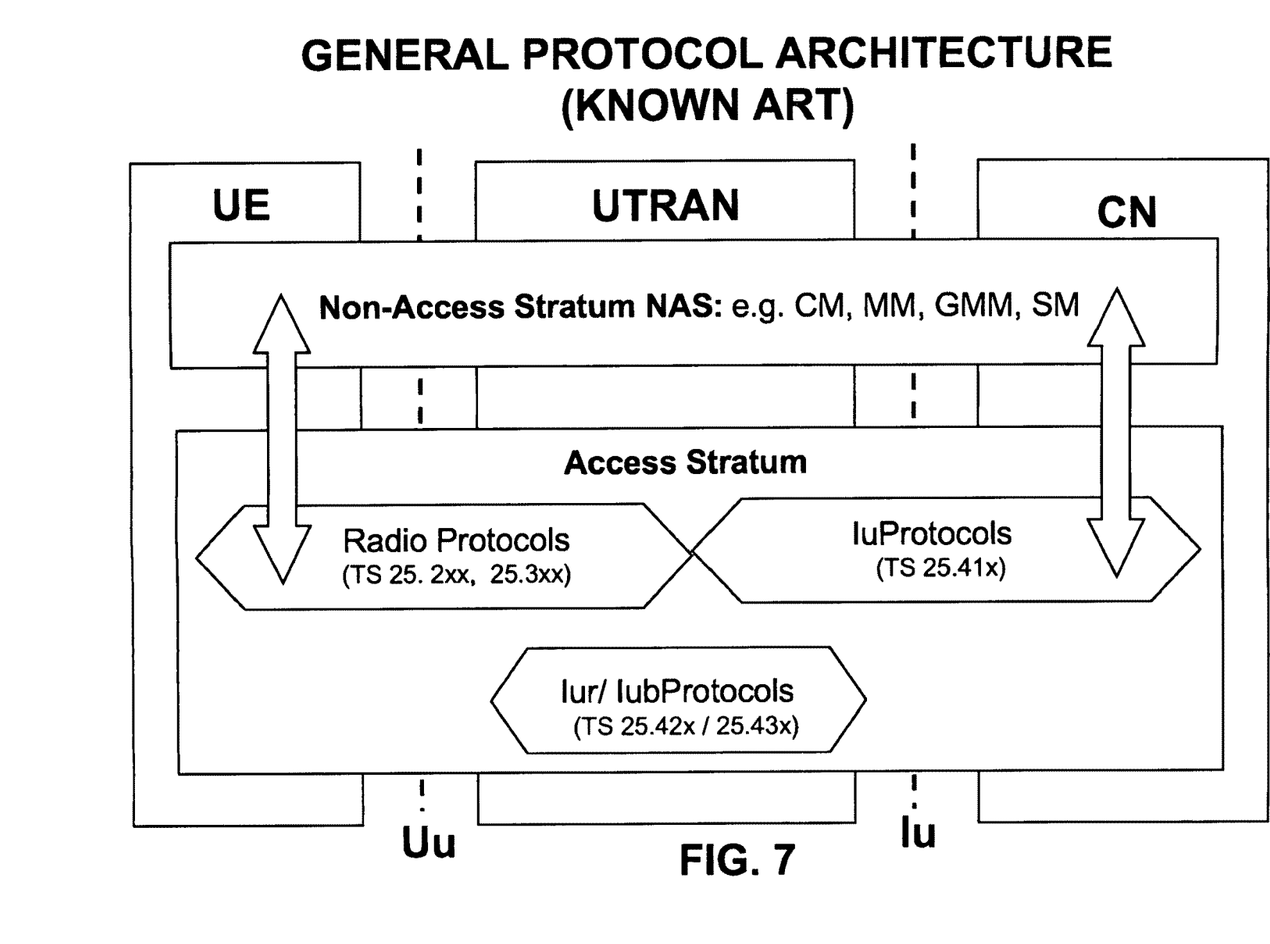
FIG. 7 shows diagrammatically the general protocol architecture of the signalling used in the UMTS network of FIG. 1a and 1b.

FIG. 7 shows diagrammatically the general protocol architecture of the signalling used in the UMTS network. For this aim the network is subdivided into the UE, UTRAN and CN parts delimited respectively by the Uu and Iu interfaces (although not shown in FIG. 7 UTRAN includes the Iur and Iub interfaces). An Access Stratum with a superimposed Non-Access Stratum (NAS) are visible in the depicted architecture. The Access Stratum includes: the Iu protocols defined in TS 25.41x, the Iur/Iub protocols defined in TS 25.42x/TS 25.43x, and the Radio protocols defined in TS 25.2xx and 25.3xx. User data and control information are exchanged between the CN and the UEs using the Radio protocols and the Iu protocols of the Access Stratum. These protocols contain mechanisms to transfer NAS messages transparently, i.e. the so-called Direct Transfer (DT) procedures. The NAS stratum includes higher levels protocols to handle control aspects, such as: CM, MM, GMM, SMS, etc.

Figure 8:
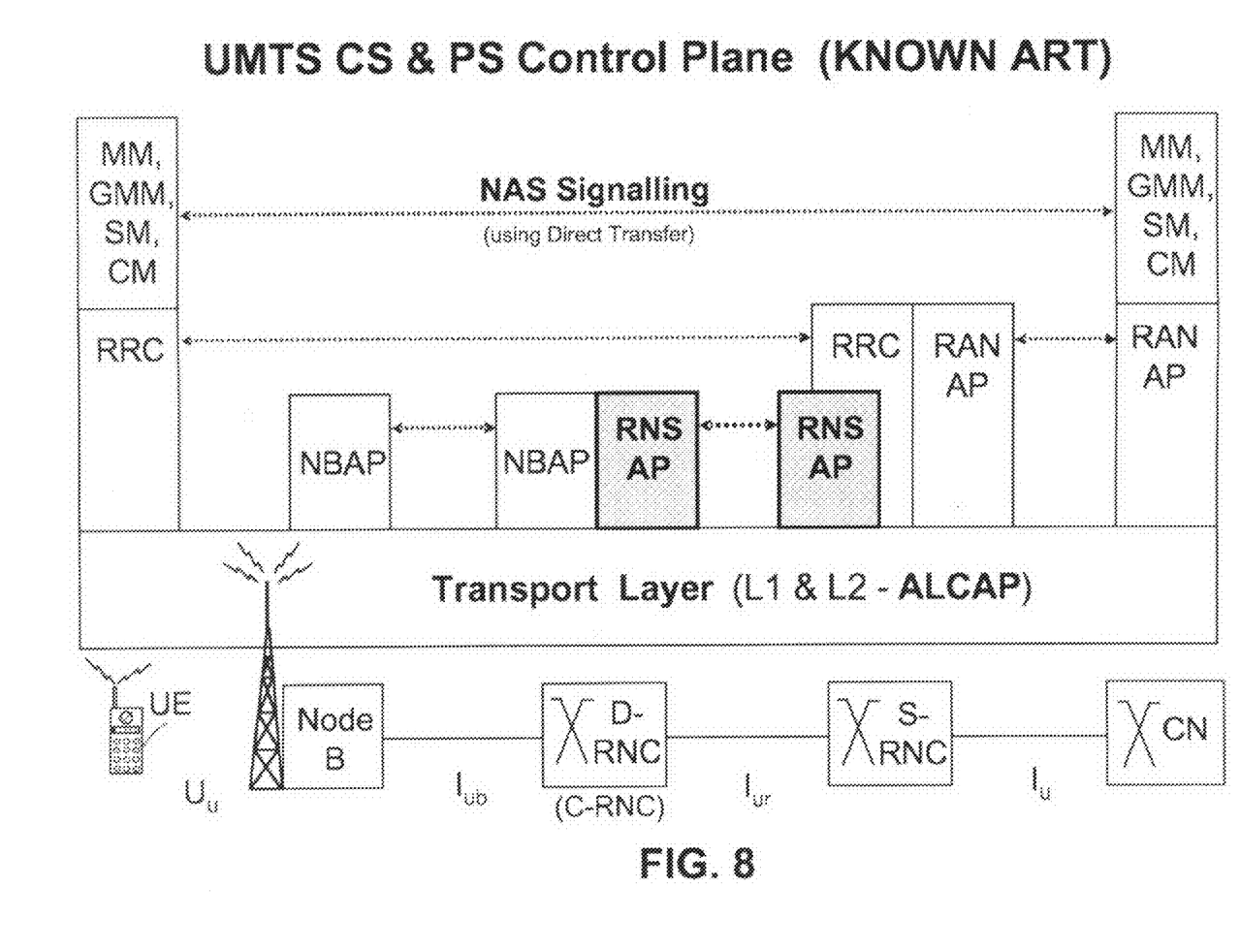
FIG. 8 shows the CS and PS Control Plane protocol stacks at the various interfaces of the UMTS network of FIGS. 1a and 1b.

FIG. 8 shows the main protocol stacks of the CS and PS Control Plane referred to the UMTS network of FIGS. 1a and 1b. At the bottom of the Figure the following elements: UE, Node B, D-RNC, S-RNC, CN and the respective interfaces Uu, Iub, Iur, Iu [Iu(CS), Iu(PS)] are depicted. The bottom part of the Control Plane includes the Transport Layer upon which the Radio Protocols and the protocols of the Non Access Stratum reside. The Transport Layer includes Level 1 (L1) and Level 2 (L2) layers and the ALCAP part. The middle part of the Control Plane includes the Radio Protocols. The NAS protocols are indicated on the top. With reference to the FIG. 8, the Transport Plane on the Uu interface consists of Level 1 (physical) UTRA FDD or TDD mode and Level 2 protocols MAC and RLC. The Transport Plane on the Iub, Iur and Iu interfaces consists of the same Level 1 for the User Plane. The User Plane includes the Data Stream(s) and the data Bearer(s) for the Data Stream(s). Each data stream is characterised by one or more frame protocols specified for that interfaces. ATM and AAL2/AAL5 are used as Layer 2 signalling protocols, in particular by the ALCAP.

The indicated Radio Protocols are the following: RRC, NBAP, RNSAP, and RANAP. RRC is used as Layer 3 protocol for control information transfer between the UE and UTRAN. RRC message carry all information required to set-up, modify, or release Radio Links (RL), which carry in their payload higher layer NAS signalling and enable UE mobility in RRC Connected mode. NBAP is used as Layer 3 protocol on the Iub interface. It carries common signalling or dedicated signalling between RNC and NodeBs. RNSAP is used as Layer 3 protocol on the Iur interface. It supports basic inter-RNC mobility and DCH traffic, as well as CCH traffic transmission. RANAP is used as Layer 3 protocol on the Iu interface. It is used for signalling between UTRAN and the Core network 1. RANAP is responsible on Iu for e.g.: Paging, RAB (RAdio Bearer) management, S-RNC relocation, security and overload control, and the NAS signalling transfer.

The indicated NAS Protocols are the following: MM, GMM, SM, and CM. The MM protocol supports function such as: UE attach/detach, security functions, and location/routing area updates. SM supports PDP context activation/de-activation for PS connections. CM is used for supporting Circuit Switched Call Control, Supplementary Services, and SMS. Besides RANAP and RRC contain Direct Transfer procedures for transparent NAS message transfer between UEs and the Core Network.

Being RNSAP the signalling part mostly involved with the present invention, some other arguments are derived by 3GPP TS 25.423. For example, a Table 1 (section 7) reported in APPENDIX 2 indicates Mapping between functions and RNSAP elementary procedures. Among these functions the Radio Link Management, and the Radio Link Supervision Measurements on Dedicated Resources have major impact with the method of the invention. Each RNC (either Serving or Drift) can use the procedures constituting said functions either to set up, maintain, survey, and terminate a radio link relevant to a cell belonging to a directly interfaced Node B. Said Radio Link is conveying voice and/or packet data signals on the DCH channel, either individually or simultaneously.

Figure 9:
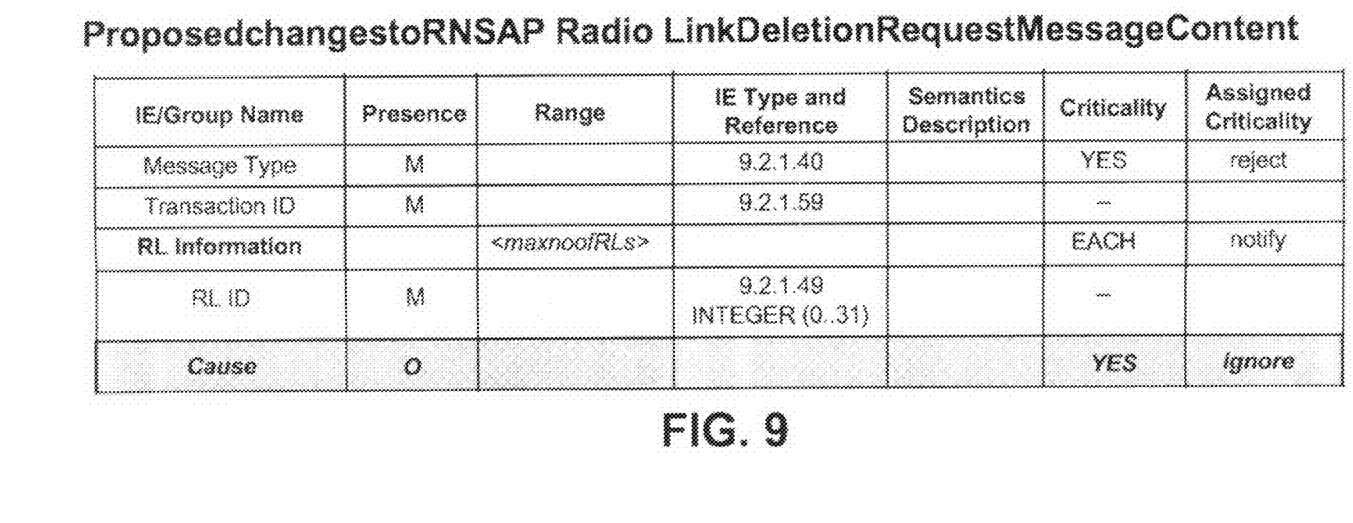
FIG. 9 shows the content of the proposed RNSAP "Radio_Link_Deletion_Request" message according to the present invention.

For the aim of supervision each RNC has room enough to store several types of Performance Counters; in particular the ones devoted to count radio link failures in the connected cells: the number of these counters is equal to the total number of cells of all the NodeBs directly interfaced to the RNC. As already said when introducing the concept of Active set, each RNC is able to act as a master or slave of the multiple radio link between the UE and ore or more NodeBs. Master or Slave RNCs are also termed S-RNC or D-RNC, respectively. Communication between the two types of RNCs in order to carry out the RNSAP procedures outlined in Table 1 avails of the Iur interface between the two Network Elements. The method of the invention makes use of the communication capabilities through the Iur interface to induce a D-RNC to count up each event associated to a cause communicated by the S-RNC terminating with the deletion of a radio link of the Active set, which is directly controlled by the D-RNC. The knowledge of the cause for this type of counting is normally owned only by the S-RNC in the role of master of the Active set, but once relevant information are transferred to a D-RNC, the latter can increment a counter on a per cell basis and on a per cause basis. Operatively, the content of the RNSAP "Radio_Link_Deletion_Request" message visible in FIG. 5 is upgraded as indicated in FIG. 9. The upgraded message differs from the known one mainly for the only addition of a "Cause" field in the column IE/Group Name and some related Information Elements (IE) on the corresponding message line. Among the release causes, the following can be foreseen in the Semantics Description column:

Cause 1): "Abnormal connection release due to definitive loss of synchronization at the side of the UE".
Cause 2): "Radio linkfailure without connection release".
Cause 3): "Normal connection release".
Cause 4): "Abnormal connection release due to excessive traffic".
Cause 5): "Radio link deletion, without or not connection release, due to RAB establishment failure".
Cause 6): "Radio link deletion due to other causes at the operator discretion".

The term "connection" shall be intended as the pool of the radio access network resources allocated to the UE for communicating with the network; e.g. to provide the user with: voice service, and/or payload data service, and/or signalling, according to either circuit switched or packet switched mode (the latter traditionally connectionless). As a consequence, the wording "connection release" might be synonym of "call release", where "call" is referable to either "voice call" or "packet call".

Based on the received delete cause, the D-RNC will be able to increment the relevant PM counter for the relevant release cause with reference to the relevant cell context. In particular, in the case that the D-RNC receives from the S-RNC a Radio_Link_Deletion_Request message for Cause 1, it shall increment the relevant PM counter with reference to the cell that was managing the radio link requested for deletion. In case that more than one cell (e.g. "M" cells in the Active set) were managing that connection, D-RNC can choose e.g. the last one admitted in the active set or all of them, thus incrementing respectively one or "M" PM counters for the indicated delete cause. The same happens for the other Causes.

Periodically the network operator recovers all the PM counters from the global UTRAN, so that he will be able to associate the specific radio link failure events to the specific geographical area (cell).

APPENDIX 1

Used Acronyms

AS Access Stratum
ALCAP Access Link Control Application Part
BSC Base Station Controller
CDMA Code Division Multiple Access
CCH Common Channel
CN Core network
CM Connection Management
CS Circuit Switched
DCH Dedicated Channel
D-RNC Drift RNC
DT Direct Transfer
FDD Frequency Division Duplex
GGSN Gateway GPRS Support Node
GMM GPRS Mobility Management
GSM Global System for Mobile
HLR Home Location Register
IP Internet Protocol
MAC Medium Access Control layer
MM Mobility Management
NAS Non Access Stratum
NBAP Node B Application Part
NE Network Element
PDP Packet Data Protocol
PLMN Public Land Mobile Network
PM Performance Measurements
PS Packet Switched
PSTN Public Switched Telephone Network
RAB Radio Access Bearer
RANAP Radio Access Network Application Part
RLC Radio Link Control layer
RNC Radio Network Controller
RNS Radio Network Subsystem
RNSAP Radio Network Subsystem Application Part
RRC Radio Resource Control layer
SM Session Management
SMS Short Message Service
SGSN Serving GPRS Support Node
S-RNC Serving RNC
TDD Time Division Duplex
TDMA Time Division Multiple Access
UE User Equipment
UTRAN Universal Terrestrial Radio Access Network
UMTS Universal Mobile Terrestrial System
VLR Visitor Location Register
3GPP 3$^{rd}$ Generation Partnership Project

TABLE 1

Mapping between functions and RNSAP elementary procedures

| Function | Elementary Procedure(s) |
| --- | --- |
| Radio Link Management | a) Radio Link Setup |
| | b) Radio Link Addition |
| | c) Radio Link Deletion |
| | d) Unsynchronised Radio Link Reconfiguration |
| | e) Synchronised Radio Link Reconfiguration Preparation |
| | f) Synchronised Radio Link Reconfiguration Commit |
| | g) Synchronised Radio Link Reconfiguration Cancellation |
| | h) Radio Link Pre-emptioni) Radio Link Activation |
| | j) Radio Link Parameter Update |
| Physical Channel Reconfiguration | Physical Channel Reconfiguration |
| Radio Link Supervision | a) Radio Link Failure |
| | b) Radio Link Restoration |
| Compressed Mode Control [FDD] | a) Radio Link Setup |
| | b) Radio Link Addition |
| | c) Compressed Mode Command |
| | d) Unsynchronised Radio Link Reconfiguration |
| | e) Synchronised Radio Link Reconfiguration Preparation |
| | f) Synchronised Radio Link Reconfiguration Commit |
| | g) Synchronised Radio Link Reconfiguration Cancellation |
| Measurements on Dedicated Resources | a) Dedicated Measurement Initiation |
| | b) Dedicated Measurement Reporting |
| | c) Dedicated Measurement Termination |
| | d) Dedicated Measurement Failure |
| DL Power Drifting Correction [FDD] | Downlink Power Control |
| DCH Rate Control | a) Radio Link Setup |
| | b) Radio Link Addition |
| | c) Unsynchronised Radio Link Reconfiguration |
| | d) Synchronised Radio Link Reconfiguration Preparation |
| | e) Radio Link Congestion |
| CCCH Signalling Transfer | a) Uplink Signalling Transfer |
| | b) Downlink Signalling Transfer |
| GERAN Signalling Transfer | a) GERAN Uplink Signalling Transfer |
| | b) Downlink Signalling Transfer |
| Paging | Paging |
| Common Transport Channel Resources Management | a) Common Transport Channel Resources Initiation |
| | b) Common Transport Channel Resources Release |
| Relocation Execution | Relocation Commit |
| Reporting of General Error Situations | Error Indication |
| Measurements on Common Resources | a) Common Measurement Initiation |
| | b) Common Measurement Reporting |
| | c) Common Measurement Termination |
| | d) Common Measurement Failure |
| Information Exchange | a) Information Exchange Initiation |
| | b) Information Reporting |
| | c) Information Exchange Termination |
| | d) Information Exchange Failure |
| DL Power Timeslot Correction [TDD] | Downlink Power Timeslot Control |
| Reset | Reset |
| UE Measurement Forwarding [TDD] | a) UE Measurement Initiation |
| | b) UE Measurement Reporting |
| | c) UE Measurement Termination |
| | d) UE Measurement Failure |
| Trace | a) Iur Invoke Trace |
| | b) Iur Deactivate Trace |

The invention claimed is:

1. A method to collect performance measurements about events related to a deletion of a radio link in a digital cellular communication network deploying an active set of a plurality of radio links between a user equipment and a radio access network, the radio links set up both inside the serving cell and towards one or more adjacent cells belonging to adjacent clusters controlled by respective radio controllers, comprising:

receiving, by a slave controller for managing directly controlled radio resources, a request from a master radio controller for a deletion of a specific radio link from the active set, the request including information about a cause of the deletion; and incrementing, by the slave controller and in response to receiving the information about the cause, a performance measurement counter associated to the cause and to a cell the radio link deletion is requested.

2. The method of claim 1,
wherein the cause information includes the indication as to whether a voice connection is released or not, or
wherein the cause information includes the indication as to whether a packet connection is released or not, or
wherein the cause information includes the indication as to whether the voice and the packet connection is released or not.

3. The method of claim 2, wherein the cause information includes an indication about an abnormal connection release due to a definitive loss of synchronization with a connected user equipment.

4. The method of claim 2, wherein the cause information includes an indication about a radio link failure without a connection release.

5. The method of claim 2, wherein the cause information includes an indication about a normal connection release.

6. The method of claim 2, wherein the cause information includes an indication about an abnormal connection release due to excessive traffic.

7. The method of claim 2, wherein the cause information includes an indication about RAB establishment failure.

8. The method of claim 2, wherein the cause information is included in a radio link deletion request message.

\* \* \* \* \*